(12) United States Patent
Sauret

(10) Patent No.: US 9,494,277 B2
(45) Date of Patent: Nov. 15, 2016

(54) PORTABLE CONFIGURABLE MODULAR SPATIAL STABILIZATION AND TRANSPORT SYSTEM FOR ENABLING MOUNTING OF AT LEAST ONE PORTABLE APPARATUS IN ACCORDANCE WITH AT LEAST ONE PLURAL CONTROLLABLE MOUNTING PROFILE

(71) Applicant: Etienne Sauret, New York, NY (US)

(72) Inventor: Etienne Sauret, New York, NY (US)

( * ) Notice: Subject to any disclaimer, the term of this patent is extended or adjusted under 35 U.S.C. 154(b) by 0 days.

(21) Appl. No.: 14/599,210

(22) Filed: Jan. 16, 2015

(65) Prior Publication Data

US 2015/0226371 A1 Aug. 13, 2015

Related U.S. Application Data

(63) Continuation of application No. 13/085,426, filed on Apr. 12, 2011, now abandoned.

(60) Provisional application No. 61/320,317, filed on Apr. 12, 2010.

(51) Int. Cl.
*B62B 3/04* (2006.01)
*F16M 11/42* (2006.01)

(52) U.S. Cl.
CPC ............ *F16M 11/425* (2013.01); *F16M 11/42* (2013.01); *B62B 3/04* (2013.01); *F16M 2200/065* (2013.01); *F16M 2200/08* (2013.01)

(58) Field of Classification Search
CPC ..... B62B 3/04; B62B 3/0612; F16M 11/425; F16M 11/42; F16M 11/00; F16M 11/20
USPC .................. 280/35, 47.34, 656, 47.41, 79.11
See application file for complete search history.

(56) References Cited

U.S. PATENT DOCUMENTS

| | | | | |
|---|---|---|---|---|
| 6,668,950 B2 * | 12/2003 | Park | ...................... | B60B 19/003 180/20 |
| 6,775,475 B1 * | 8/2004 | Traver | .................... | G03B 15/00 352/243 |
| 7,140,622 B1 * | 11/2006 | Cantu | ..................... | B62B 3/001 108/55.3 |
| 8,142,019 B2 * | 3/2012 | Hernandez | ............. | F16M 11/42 348/373 |
| 2006/0032728 A1 * | 2/2006 | Smith | .................... | B62D 65/18 198/468.6 |

* cited by examiner

*Primary Examiner* — John Walters
(74) *Attorney, Agent, or Firm* — Lawrence H. Frank; Resek, Liang & Frank, LLP

(57) ABSTRACT

A portable configurable modular spatial stabilization and transport system that enables mounting of at least one apparatus in accordance with at least one plural controllable mounting profile, securing the apparatus, or one or more mobile profiles, in which the apparatus is movable. The system comprises an elongated base platform comprising a plurality of securable stabilization elements, and a selectively movable mounting platform for interfacing with one or more apparatus mounting interfaces, that may be secured to or moved along the base platform, thereby enabling any apparatus interfaced therewith to be mounted in one or more predefined mounting profiles. The system alternatively comprises an independent wheeled platform configured to interface with at least one predetermined apparatus mounting interface that is compatible with the mounting platform, such that an apparatus mounted on the mounting platform can be readily repositioned on the wheeled platform, and vice versa, without removing the mounting interface therefrom.

17 Claims, 24 Drawing Sheets

PORTABLE CONFIGURABLE MODULAR SPATIAL STABILIZATION AND TRANSPORT SYSTEM FOR ENABLING MOUNTING OF AT LEAST ONE PORTABLE APPARATUS IN ACCORDANCE WITH AT LEAST ONE PLURAL CONTROLLABLE MOUNTING PROFILE

CROSS REFERENCE TO RELATED APPLICATIONS

The present patent application is a continuation of U.S. patent application Ser. No. 13/085,426, filed on Apr. 12, 2011, which claims priority from the commonly assigned co-pending U.S. provisional patent application 61/320,317 entitled "Portable Configurable Modular Spatial Stabilization and Transport System for Enabling Mounting of at Least One Portable Apparatus in Accordance with at Least One Plural Controllable Mounting Profile", filed Apr. 12, 2010.

FIELD OF THE INVENTION

The present invention relates generally to systems and devices for mounting devices such as cameras, lights, etc. in a controllable and movable, such as dollies, etc., and more particularly to portable configurable modular spatial stabilization and transport system that enables mounting of at least one apparatus (e.g., camera, etc.) in accordance with at least one plural controllable mounting profile.

BACKGROUND OF THE INVENTION

While various dollies, mobile camera mounts, and camera and other equipment stabilization devices, are widely used in various media content industries (TV, film, commercials, photography, etc.), they suffer from many disadvantages, including but not limited to being expensive, heavy, difficult to set up/configure (and correspondingly being difficult to reposition as may be needed for different shots), and most importantly being inflexible with respect to compatibility with cameras, various other A/V equipment, and with stabilization/anchoring solutions. Moreover, changing between different mounting solutions (e.g., moving a camera from a rail-based dolly mount to a carriage based mount) is especially time-consuming and frustrating. The weight, bulkiness of currently used dolly systems as well as the need to transport different mounting solutions for different needs also greatly limits the use of dolly-type equipment in mobile shoots (such as on-location shooting, documentaries, etc.)

It would thus be desirable to provide a lightweight, portable, inexpensive, modular easily configurable A/V equipment mounting system that can serve all possible functions of stabilizing the equipment, and precisely controlling its position in both static modes and in mobile modes in which the equipment can move along the system or on an independent free-roaming mount.

BRIEF DESCRIPTION OF THE DRAWINGS

In the drawings, wherein like reference characters denote corresponding or similar elements throughout the various figures.

SUMMARY OF THE INVENTION

Figure 1A:
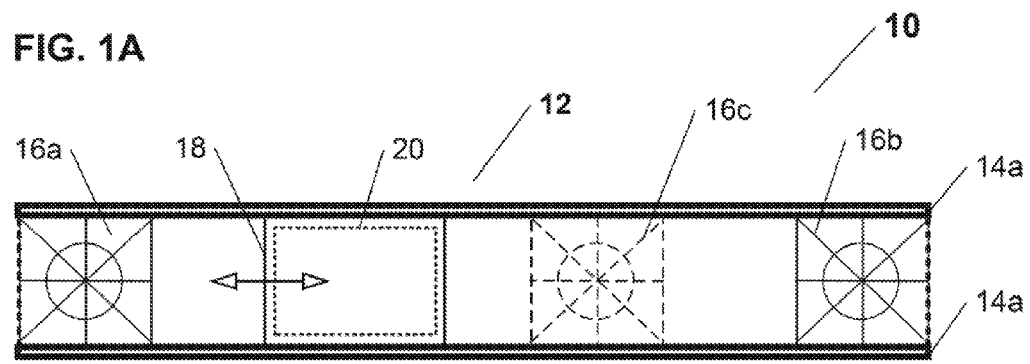
FIG. 1A is an exemplary schematic top-down view diagram illustrating a first exemplary embodiment of the inventive portable configurable multi-profile equipment mounting system.

The present invention is directed to a portable configurable modular spatial stabilization and transport system that enables mounting of at least one apparatus (e.g., camera, etc.) in accordance with at least one plural controllable mounting profile, which may be a static profile with precisely controlled positioning of the mounted apparatus, or one or more mobile profiles in which the mounted apparatus may be moved in a controlled manner.

The inventive system comprises an elongated base platform 12 comprising a plurality of selectively positioned stabilization elements 14a-16c securable to one or more stability sources (boxes, mounts, clamps, etc.), and a selectively movable mounting platform 18 sized and configured for interfacing with one or more apparatus mounting interfaces 20, and configured for being selectively secured at any predetermined position along the base platform, or for being selectively moved along the base platform in a predefined motion range, thereby enabling any apparatus interfaced therewith to be mounted in one or more predefined mounting profiles.

In another embodiment of the present invention the system also comprises an independent wheeled platform configured to interface with at least one predetermined apparatus mounting interface that is compatible with the mounting platform, such that an apparatus mounted on the mounting platform can be readily removed and repositioned on the wheeled platform, and vice versa, without removing the mounting interface therefrom. The inventive system is scalable and may be configured with a base platform of any practical desired length and width, with commensurately sized other corresponding system components.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims.

DETAILED DESCRIPTION OF PREFERRED EMBODIMENTS

Referring now to FIGS. 1A to 2B, the present invention is directed to a portable configurable modular spatial stabilization and transport system 10 that enables mounting of at least one apparatus (e.g., camera, etc.) in accordance with at least one plural controllable mounting profile, which may be a static profile with precisely controlled positioning of the mounted apparatus, or one or more mobile profiles in which the mounted apparatus may be moved in a controlled manner.

The inventive system comprises an elongated base platform 12 comprising a plurality of selectively positioned stabilization elements 12a-16c securable to one or more stability sources (boxes, mounts, clamps, etc.), and a selectively movable mounting platform 18 sized and configured for interfacing with one or more apparatus mounting interfaces 20, and configured for being selectively secured at any predetermined position along the base platform, or for being selectively moved along the base platform in a predefined motion range, thereby enabling any apparatus interfaced therewith to be mounted in one or more predefined mounting profiles.

Figure 2A:
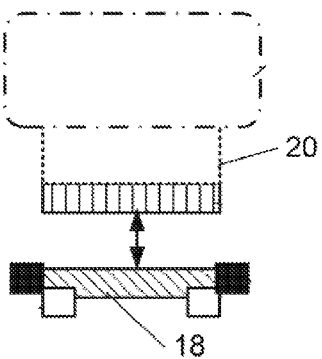
FIG. 2A is an exemplary schematic side view diagram illustrating a first exemplary embodiment of a mounting platform module, configured to receive and secure at least one predefined apparatus thereon, through a corresponding mounting interface, said mounting platform module being a component of the inventive system of FIGS. 1A and 1B.
Figure 2B:
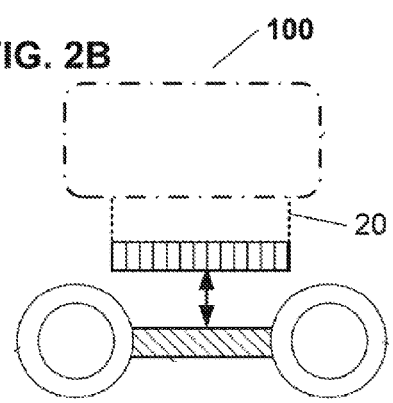
FIG. 2B is an exemplary schematic side view diagram illustrating a first exemplary embodiment of a mobile platform module, configured to receive and secure at least one predefined apparatus thereon, through a corresponding mounting interface, said mobile platform module being compatible with the corresponding interface of FIG. 2A.

In another embodiment of the present invention the system also comprises an independent wheeled platform 100, shown in FIG. 2B configured to interface with at least one predetermined apparatus mounting interface that is compatible with the mounting platform, such that an apparatus mounted on the mounting platform can be readily removed and repositioned on the wheeled platform, and vice versa, without removing the mounting interface therefrom. The inventive system is scalable and may be configured with a base platform of any practical desired length and width, with commensurately sized other corresponding system components.

Figure 1B:
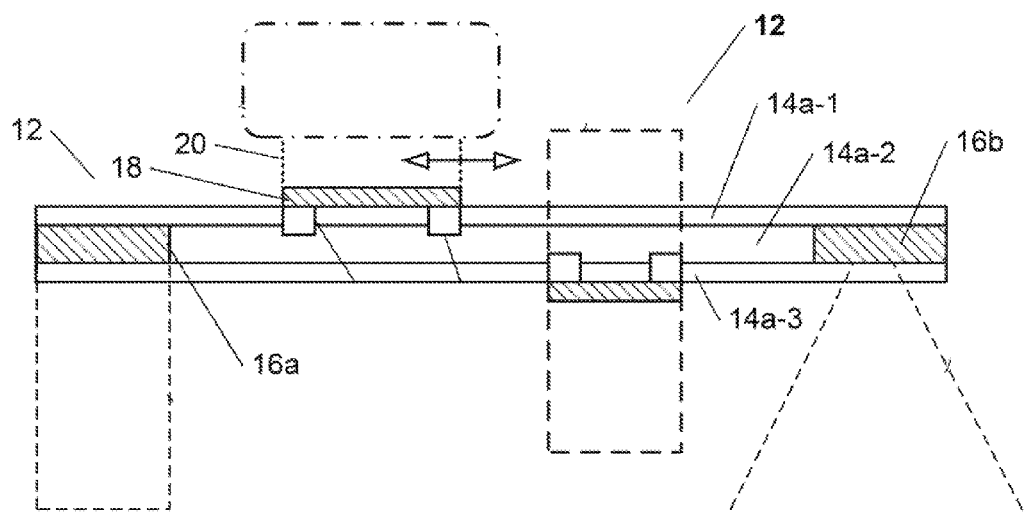
FIG. 1B is an exemplary schematic side view diagram illustrating the inventive portable configurable multi-profile equipment mounting system of FIG. 1A, shown as being secured to a plurality of exemplary anchoring sources.
Figure 3A:
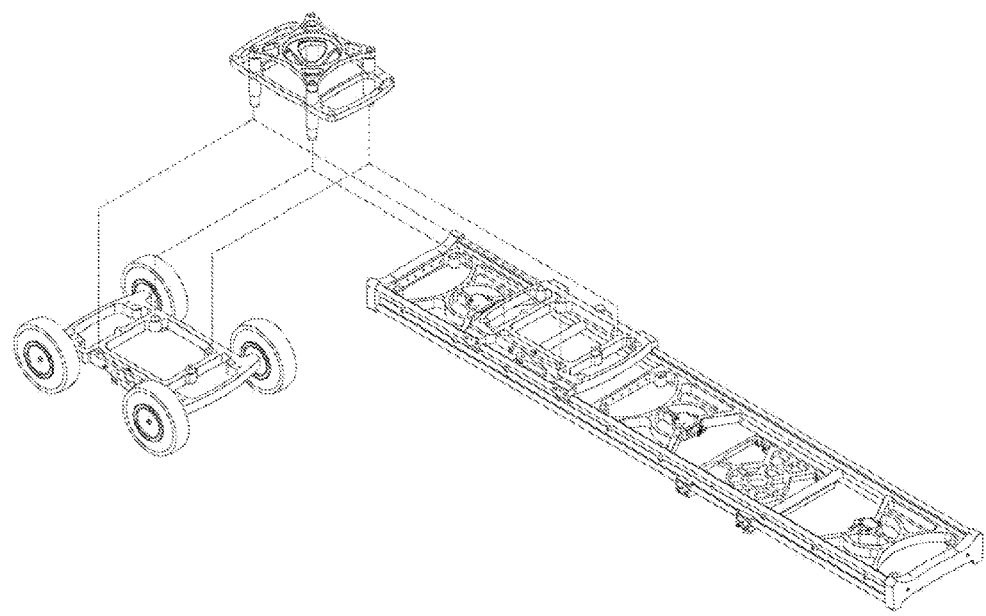
FIG. 3A is an isometric view of an exemplary embodiment of the modular multi-profile equipment mounting system of FIGS. 1A-1B, together with alternate exemplary embodiments of the mounting platform module of FIG. 2A, and the mobile platform module of FIG. 2B.
Figure 3B:
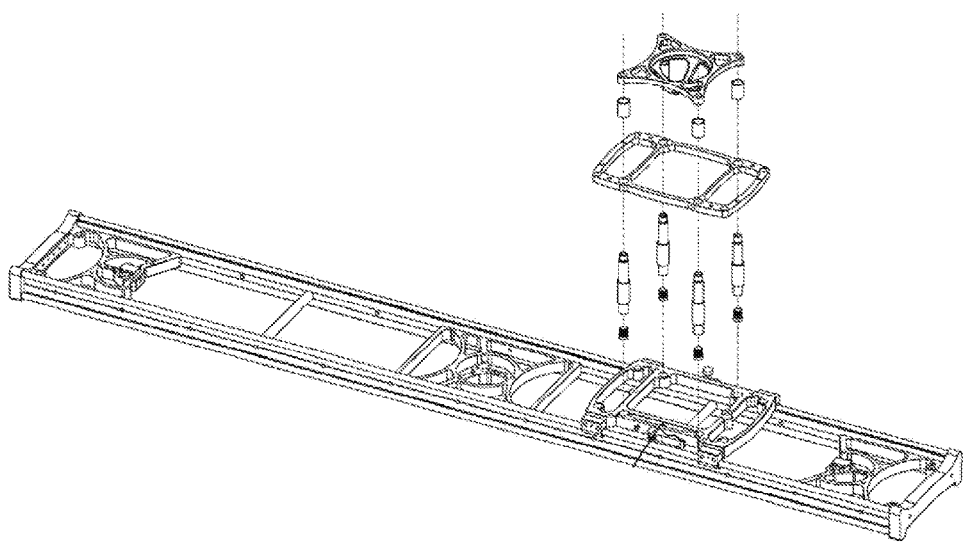
FIG. 3B is an isometric exploded view of the modular multi-profile equipment mounting system embodiment of FIG. 3A, together with the alternate exemplary embodiment of the mounting platform module of FIG. 2A.

Referring now to FIG. 3A, an isometric view is shown of an exemplary embodiment of the modular multiprofile equipment mounting system of FIGS. 1A-1B, together with alternate exemplary embodiments of the mounting platform module of FIG. 2A, and the mobile platform module of FIG. 2B;

Referring now to FIG. 3B, an isometric exploded view is shown of the modular multi-profile equipment mounting system embodiment of FIG. 3A, together with the alternate exemplary embodiment of the mounting platform module of FIG. 2A.

Figure 3C:
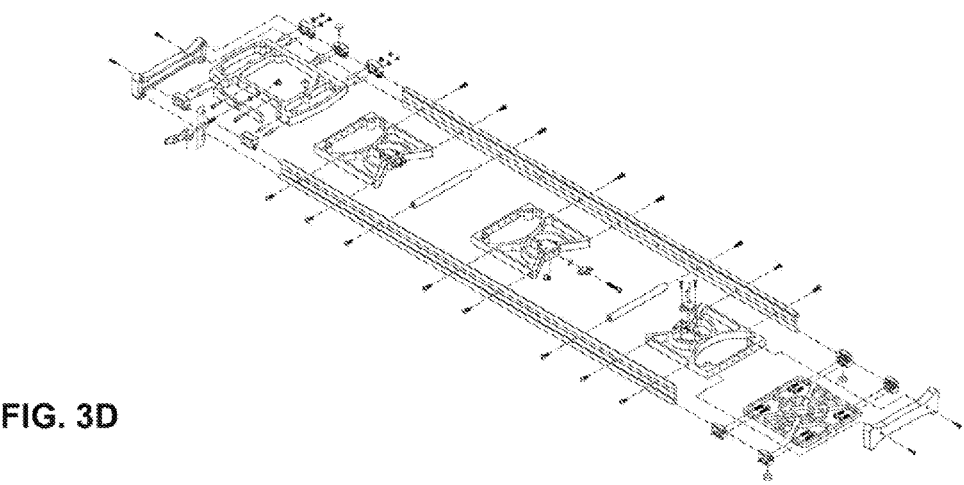
FIG. 3C is an isometric exploded view of the modular multi-profile equipment mounting system embodiment of FIG. 3A.
Figure 3D:
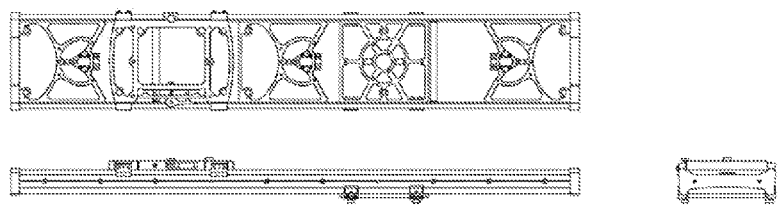
FIG. 3D shows various views of the modular multiprofile equipment mounting system embodiment of FIG. 3A.
Figure 4A:
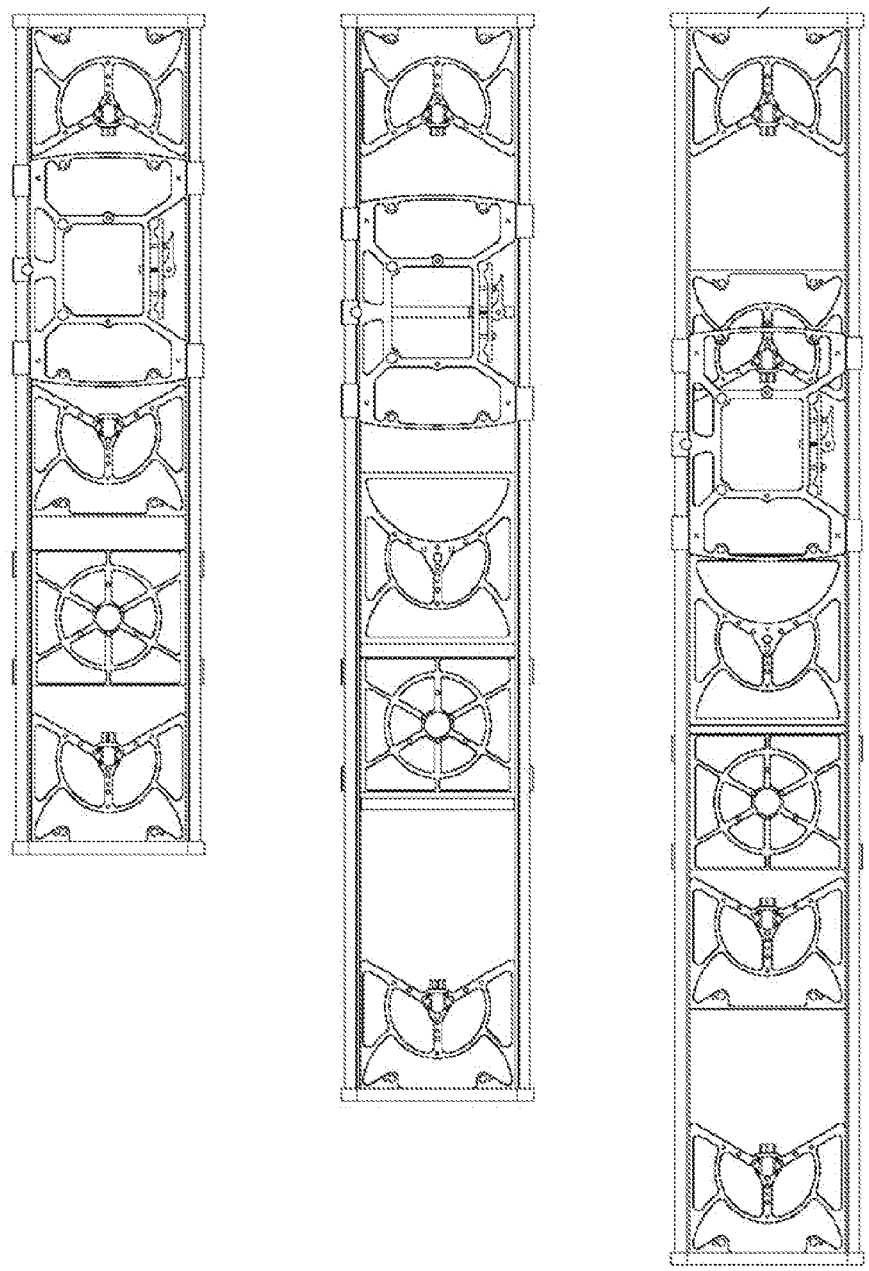
FIGS. 4A to 4B are top-down views of various exemplary mounting system embodiments of the mounting system of FIGS. 1A and 1B, shown in different implementation sizes.
Figure 4B:
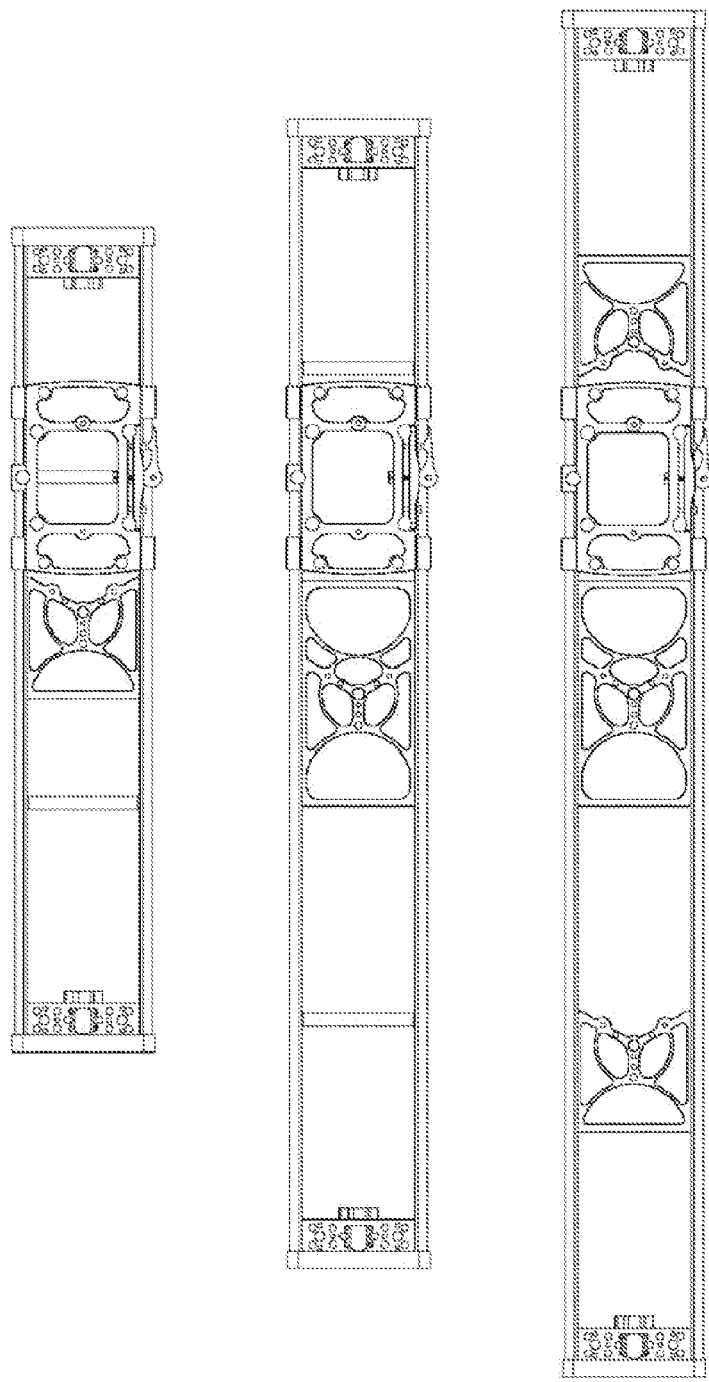
Figure 4C:
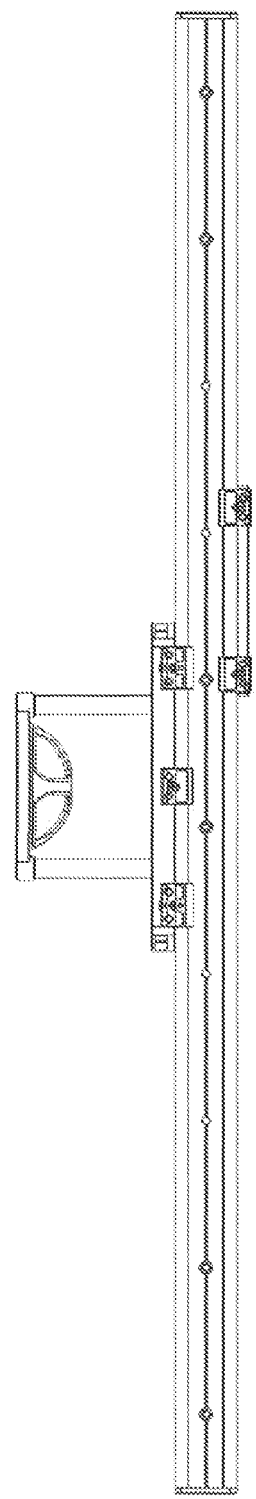
FIGS. 4C to 4D are various views showing an alternate exemplary implementation embodiment of the mounting system of FIGS. 1A and 1B.
Figure 4D:
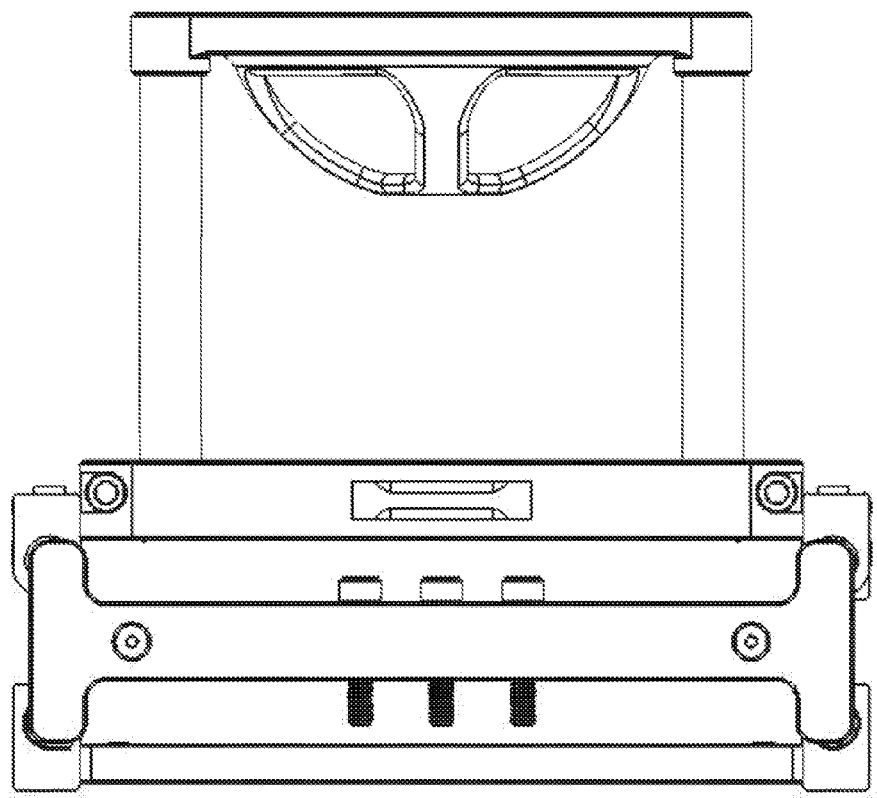
Figure 5A:
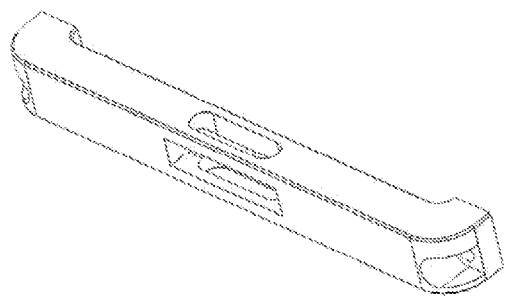
FIG. 5A is an isometric view of an exemplary embodiment of a handle that may be attached to at least one of the endpoints of the exemplary mounting system embodiments of FIGS. 3A to 4D, and/or of at least one of the endpoints of the exemplary mounting platform module of FIGS. 6A to 6E, below.
Figure 5B:
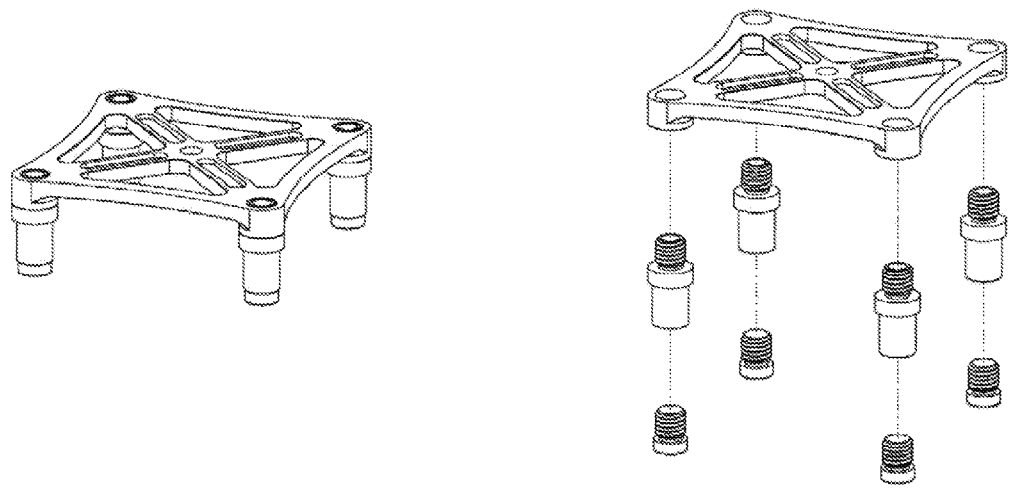
FIG. 5B shows isometric assembled and exploded views of an exemplary embodiment of an elevating spacer module that may be utilized in conjunction with at least one of the exemplary embodiments of the mounting platform module of FIG. 2A, and the mobile platform module of FIG. 2B.
Figure 6A:
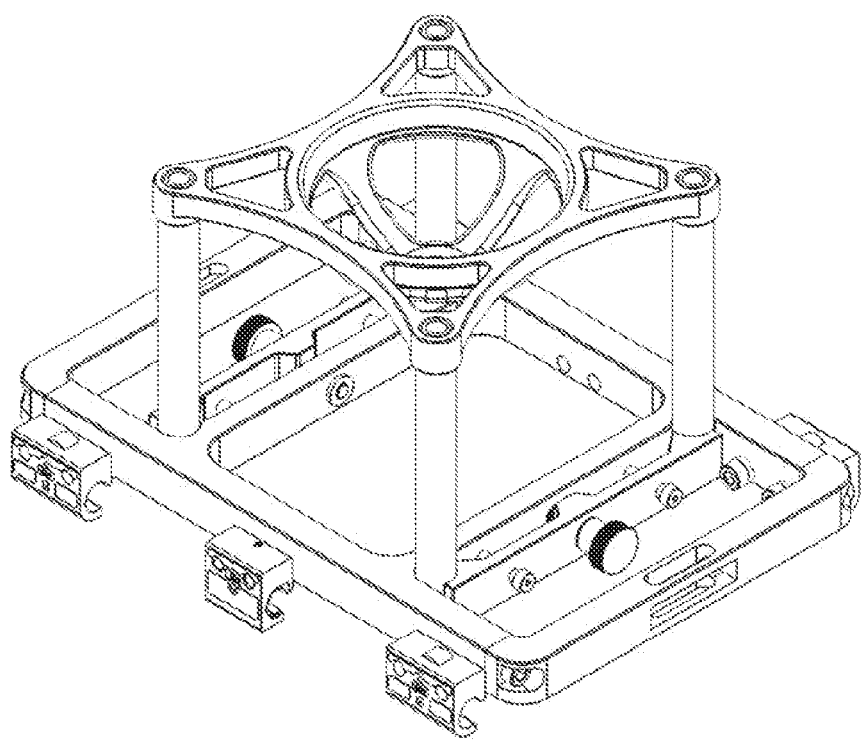
FIGS. 6A to 6D are various views showing an exemplary embodiment of the mounting platform module of FIG. 2A comprising an equipment mounting module for receiving and retaining various electrical, electronic, and/or optical equipment, and that is configured for use as a component of the inventive mounting system exemplary embodiments of FIGS. 3A to 4D.
Figure 6B:
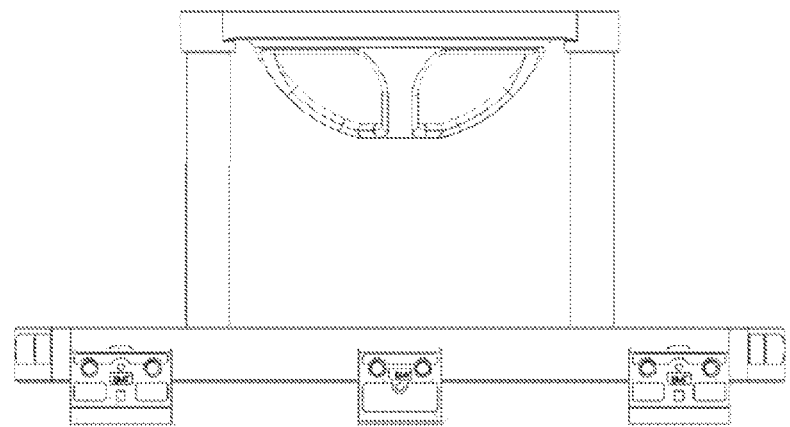
Figure 6C:
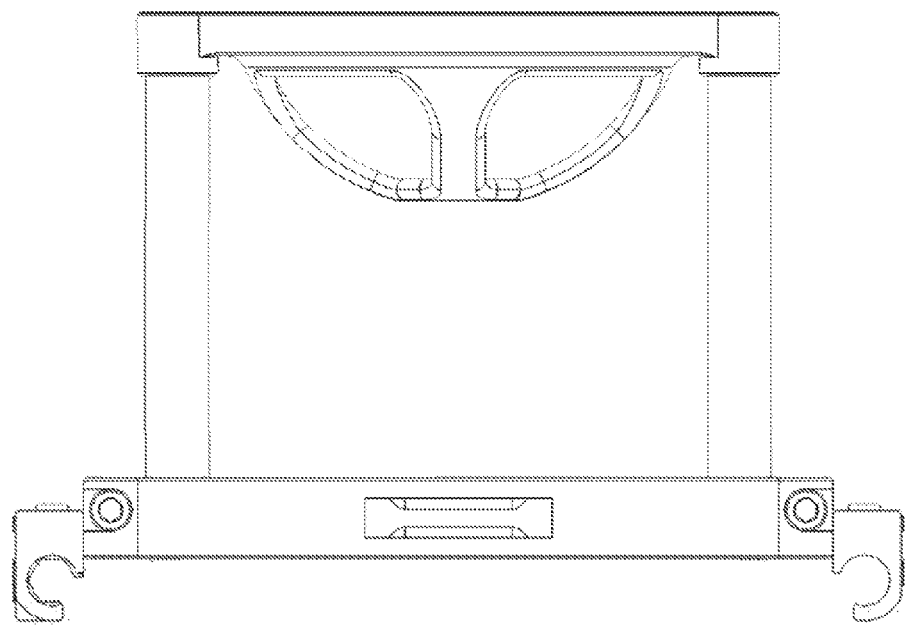
Figure 6D:
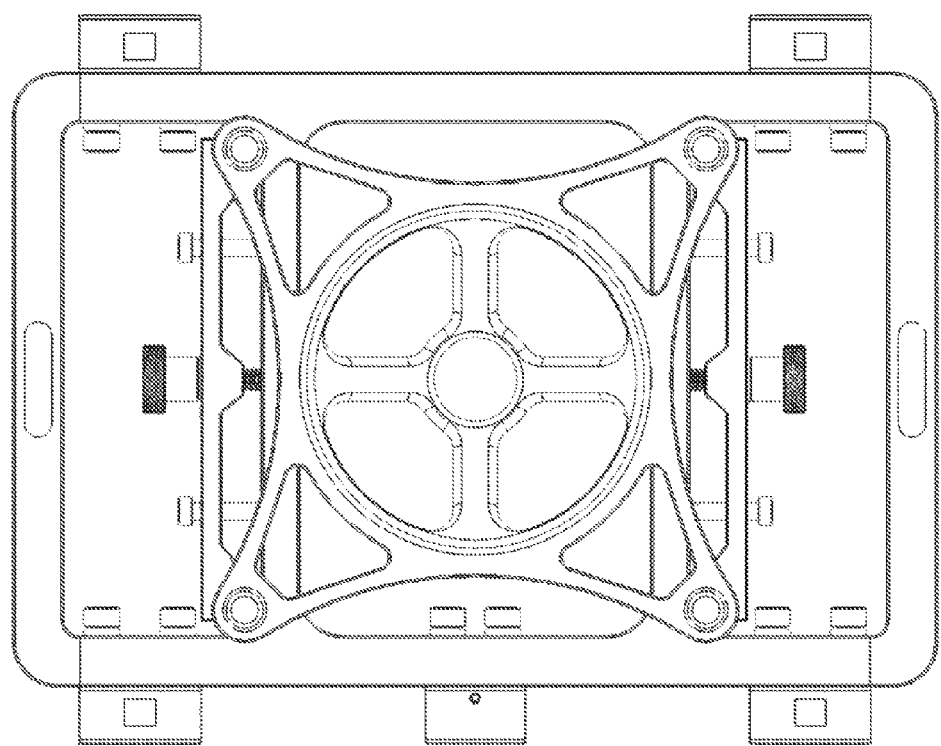
Figure 6E:
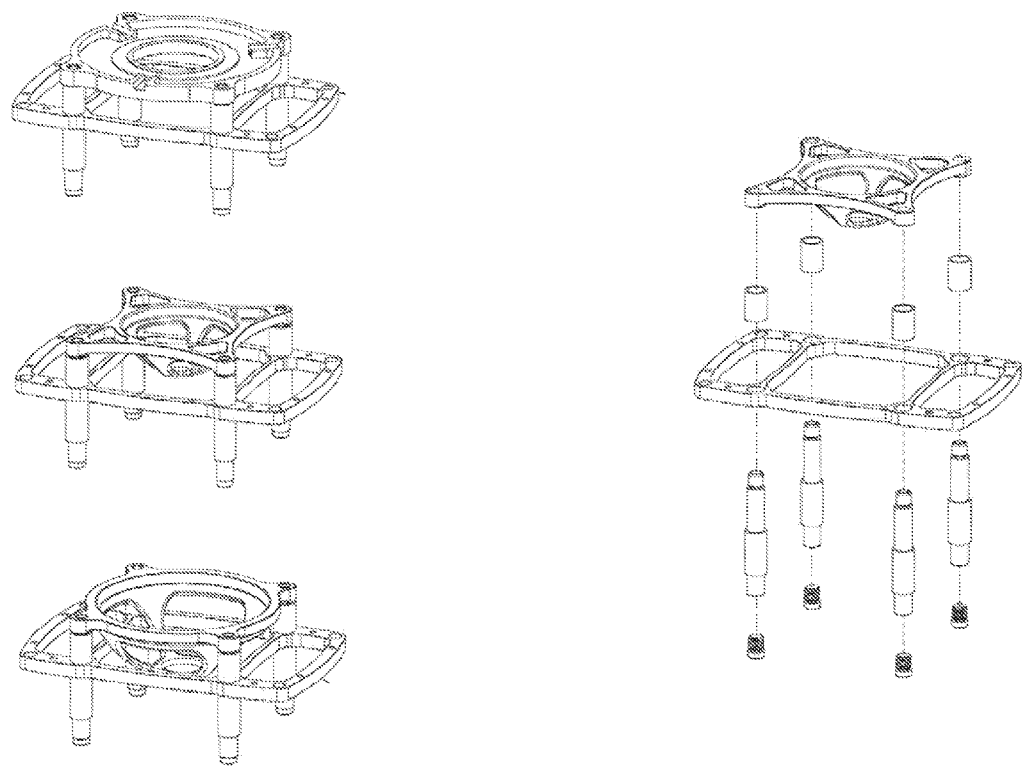
FIG. 6E shows various assembled and exploded isometric views showing an exemplary embodiment of an equipment mounting module that may be utilized in conjunction with at least one of the exemplary embodiments of the mounting platform module of FIG. 2A, and the mobile platform module of FIG. 2B, and that is configured for use as a component of the inventive mounting system exemplary embodiments of FIGS. 3A to 4D.
Figure 7:
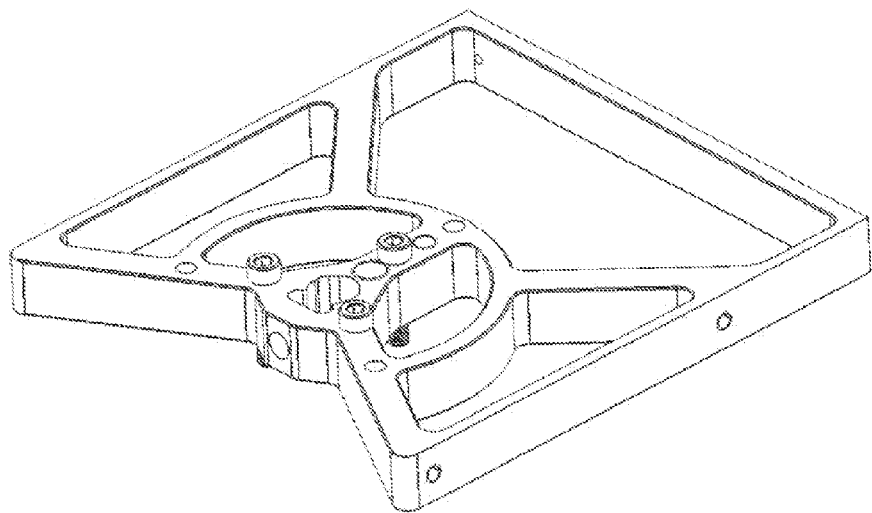
FIG. 7 is an isometric view of an exemplary embodiment of a stabilization element, that may be positioned at plural predefined regions of the exemplary mounting system of FIGS. 3A to 4D, and which is selectively securable to one or more stability sources (boxes, mounts, clamps, etc.)
Figure 8A:
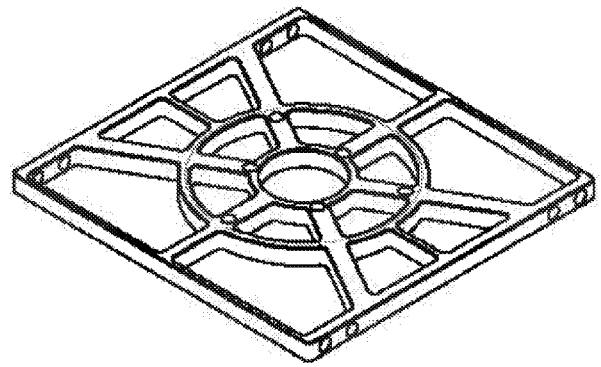
FIGS. 8A and 8B are views of an alternate exemplary embodiment of a stabilization element, that may be positioned at plural predefined regions of the exemplary mounting system of FIGS. 3A to 4D, on a different height level than the stabilization element of FIG. 7, and which may be selectively and readily repositioned during use of the mounting system.
Figure 8B:
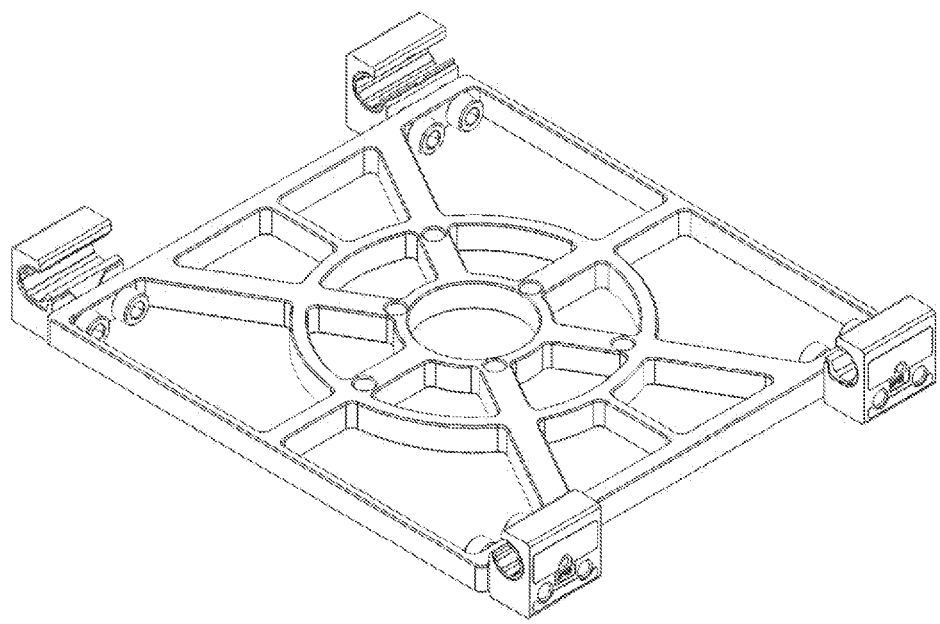
Figure 9A:
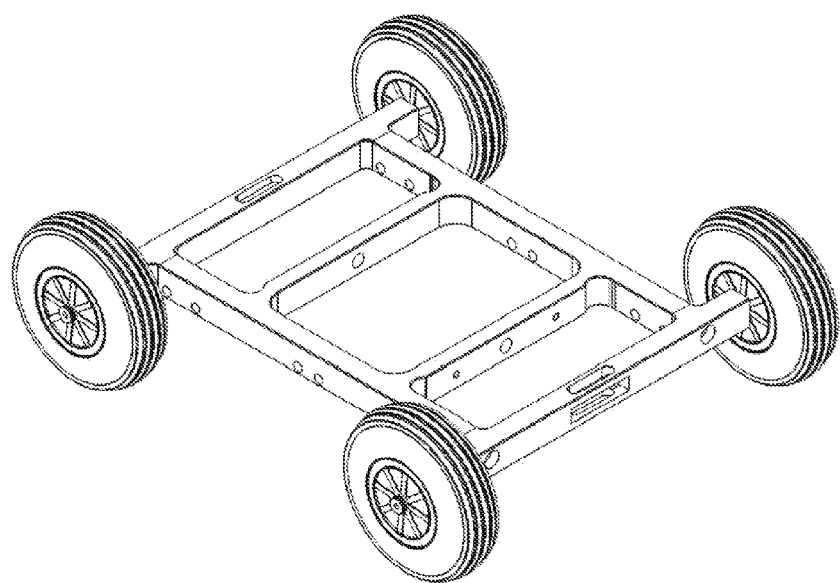
FIGS. 9A to 9D are various views showing a first exemplary embodiment of the mobile platform module of FIG. 2B, that is configured to be compatible with an apparatus interface system utilized in the exemplary mounting system embodiments of FIGS. 6A to 6E.
Figure 9B:
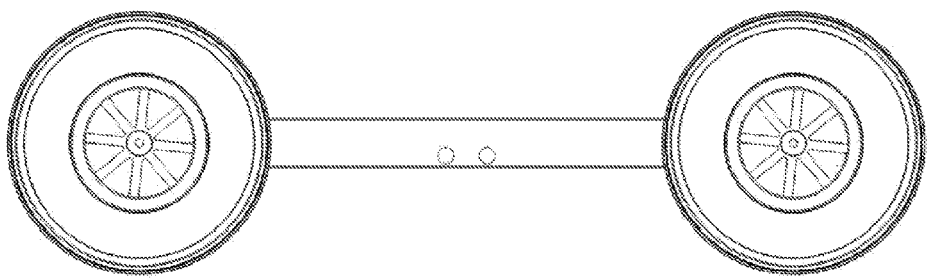
Figure 9C:
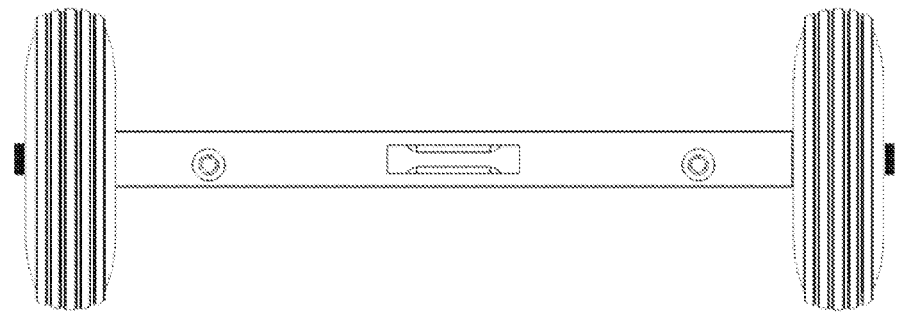
Figure 9D:
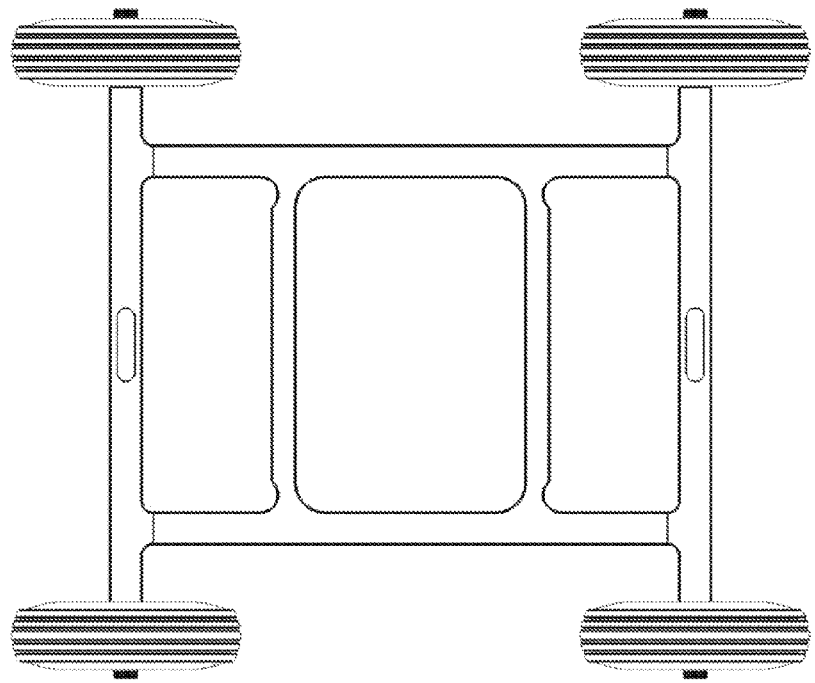
Figure 10A:
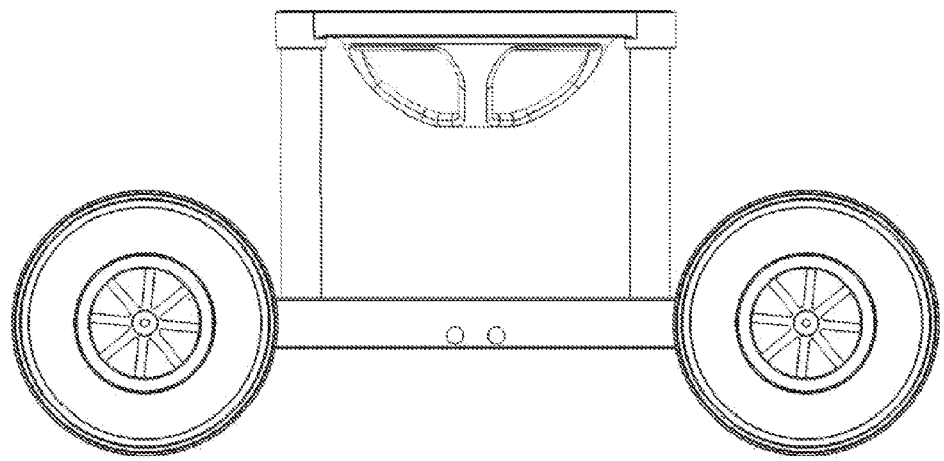
FIGS. 10A to 10E are various views showing the exemplary mobile platform module embodiment of FIGS. 9A to 9D, further comprising a configurable apparatus mounting interface positioned thereon, illustrating an exemplary implementation of the mobile module of FIG. 2B, with the configurable mounting being compatible with an apparatus interface system utilized in the exemplary mounting system embodiments of FIGS. 6A to 6E.
Figure 10B:
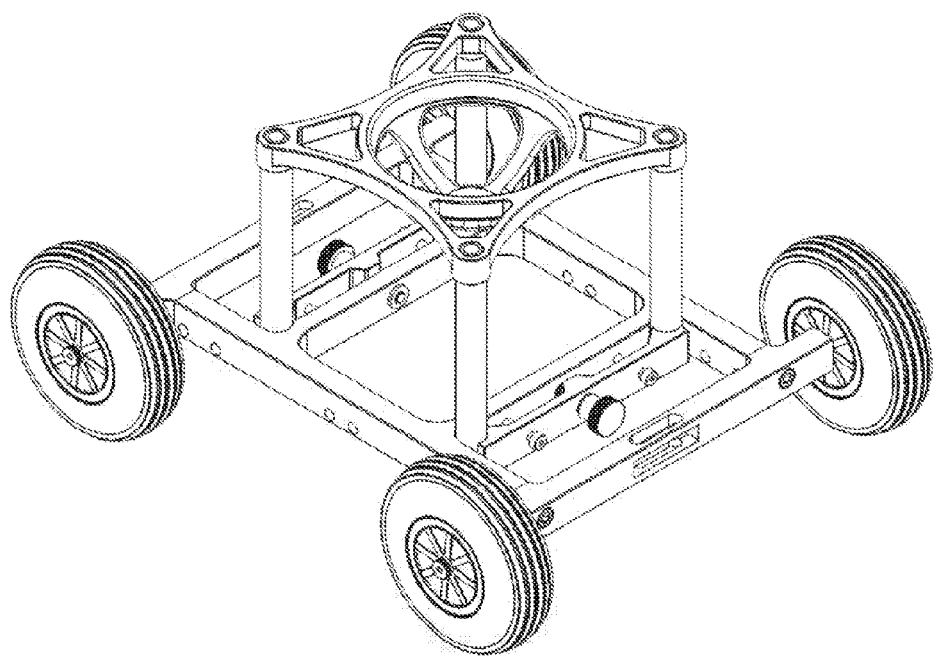
Figure 10C:
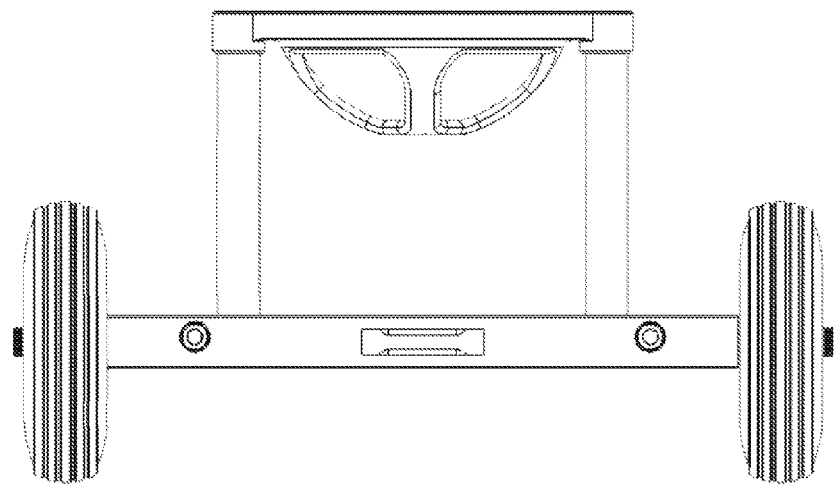
Figure 10D:
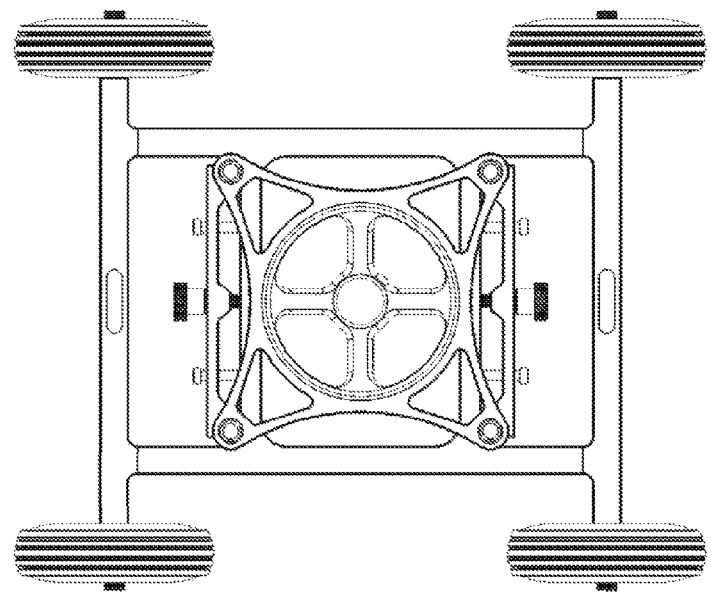
Figure 10E:
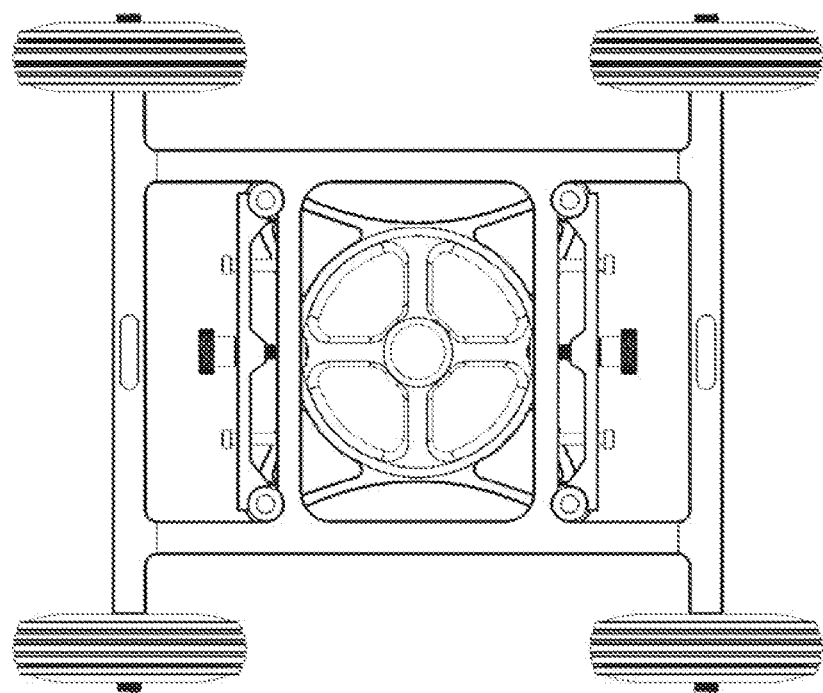
Figure 11A:
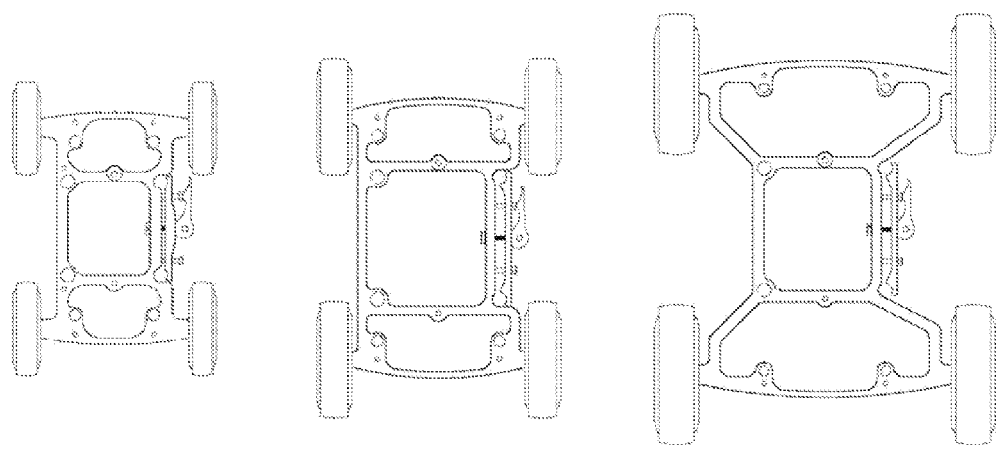
FIG. 11A shows top views of various alternate embodiments of the mobile module of FIG. 2B, shown, by way of example as being implemented in three different sizes.
Figure 11B:
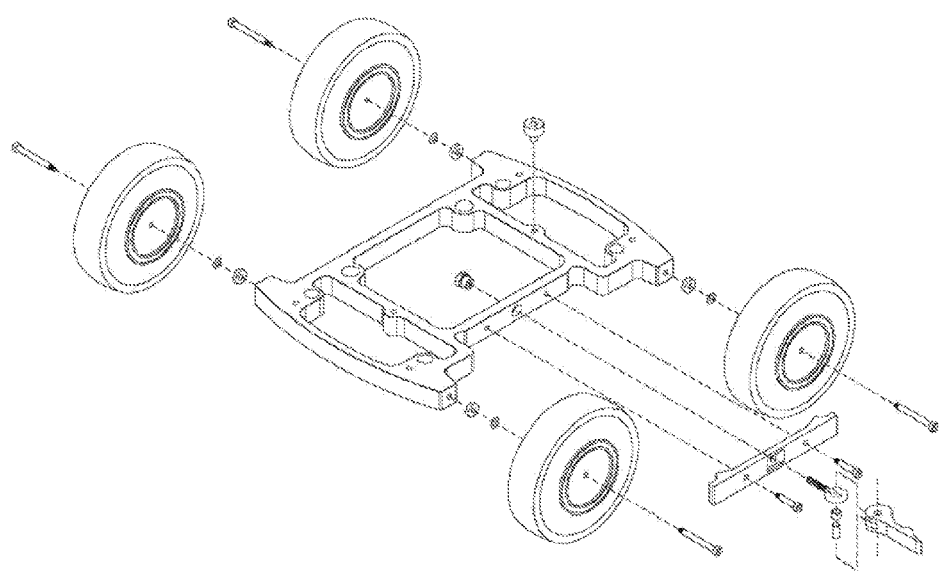
FIG. 11B shows an isometric exploded view of one embodiment of the mobile modules of FIG. 11A.
Figure 12A:
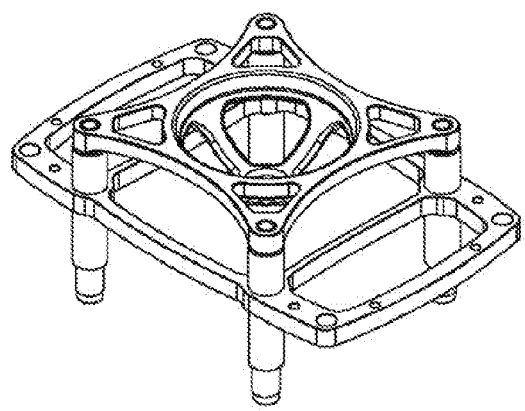
FIGS. 12A-12B show isometric exploded and assembled views of one embodiment of the mobile modules of FIG. 11A having an exemplary equipment mounting module of FIG. 6E mounted thereon.
Figure 12A:
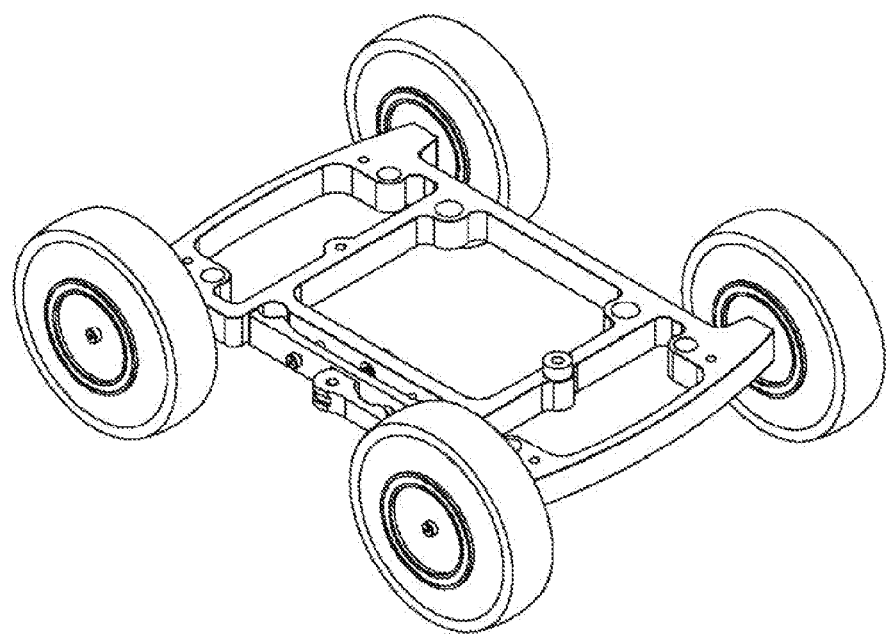
Figure 12B:
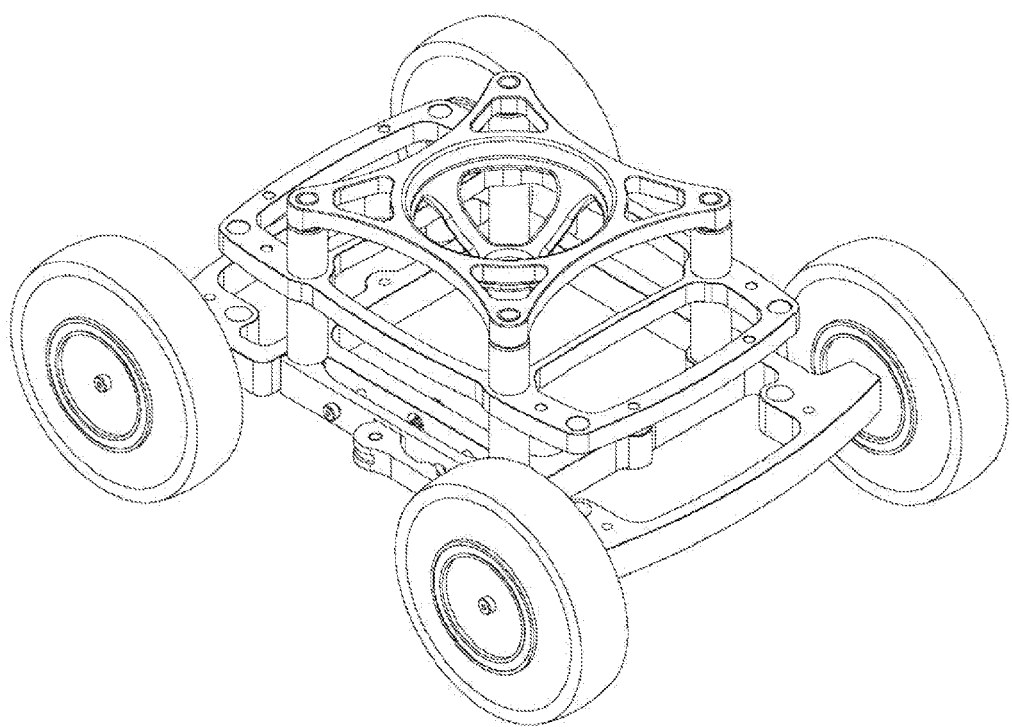

Referring now to FIG. 3C, an isometric exploded view is shown of the modular multi-profile equipment mounting system embodiment of FIG. 3A;

Referring now to FIG. 3D, various views is shown of the modular multi-profile equipment mounting system embodiment of FIG. 3A;

Referring now to FIGS. 4A to 4B, top-down views are shown of various exemplary mounting system embodiments of the mounting system of FIGS. 1A and 1B, shown in different implementation sizes;

Referring now to FIGS. 4C to 4D various views is shown showing an alternate exemplary implementation embodiment of the mounting system of FIGS. 1A and 1B;

Referring now to FIG. 5A an isometric view is shown of an exemplary embodiment of a handle that may be attached to at least one of the endpoints of the exemplary mounting system embodiments of FIGS. 3A to 4D, and/or of at least one of the endpoints of the exemplary mounting platform module of FIGS. 6A to 6E, below;

Referring now to FIG. 5B, isometric assembled and exploded views are shown of an exemplary embodiment of an elevating spacer module that may be utilized in conjunction with at least one of the exemplary embodiments of the mounting platform module of FIG. 2A, and the mobile platform module of FIG. 2B;

Referring now to FIGS. 6A to 6D various views are shown of an exemplary embodiment of the mounting platform module of FIG. 2A comprising an equipment mounting module for receiving and retaining various electrical, electronic, and/or optical equipment, and that is configured for use as a component of the inventive mounting system exemplary embodiments of FIGS. 3A to 4D;

Referring now to FIG. 6E various assembled and exploded isometric views are shown of an exemplary embodiment of an equipment mounting module that may be utilized in conjunction with at least one of the exemplary embodiments of the mounting platform module of FIG. 2A, and the mobile platform module of FIG. 2B, and that is configured for use as a component of the inventive mounting system exemplary embodiments of FIGS. 3A to 4D;

Referring now to FIG. 7 an isometric view is shown of an exemplary embodiment of a stabilization element, that may be positioned at plural predefined regions of the exemplary mounting system of FIGS. 3A to 4D, and which is selectively securable to one or more stability sources (boxes, mounts, clamps, etc.);

Referring now to FIGS. 8A and 8B, various views are shown of an alternate exemplary embodiment of a stabilization element, that may be positioned at plural predefined regions of the exemplary mounting system of FIGS. 3A to 4D, on a different height level than the stabilization element of FIG. 7, and which may be selectively and readily repositioned during use of the mounting system;

Referring now to FIGS. 9A to 9D, various views are shown of a first exemplary embodiment of the mobile platform module of FIG. 2B, that is configured to be compatible with an apparatus interface system utilized in the exemplary mounting system embodiments of FIGS. 6A to 6E;

Referring now to FIGS. 10A to 10E, various views are shown of the exemplary mobile platform module embodiment of FIGS. 9A to 9D, further comprising a configurable apparatus mounting interface positioned thereon, illustrating an exemplary implementation of the mobile module of FIG. 2B, with the configurable mounting being compatible with an apparatus interface system utilized in the exemplary mounting system embodiments of FIGS. 6A to 6E;

Referring now to FIG. 11A, top views of various alternate embodiments of the mobile module of FIG. 2B, are shown, by way of example as being implemented in three different sizes;

Referring now to FIG. 11B, an isometric exploded view is shown of one embodiment of the mobile modules of FIG. 11A; and Referring now to FIGS. 12A-12B, isometric exploded and assembled views are shown of one embodiment of the mobile modules of FIG. 11A, having an exemplary equipment mounting module of FIG. 6E mounted thereon.

Thus, while there have been shown and described and pointed out fundamental novel features of the inventive system and method as applied to preferred embodiments thereof it will be understood that various omissions and substitutions and changes in the form and details of the devices and methods illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. It is the intention, therefore, to be limited only as indicated by the scope of the claims appended hereto.

I claim:

1. A portable configurable modular spatial stabilization and transport system for mounting at least one apparatus thereon, comprising:
   a modular stabilization platform operable to receive and releasably connect to the at least one apparatus; and
   means for mounting the at least one apparatus on said modular stabilization platform in accordance with at least one plural controllable mounting profile, comprising at least one of a static profile with a selectively controlled positioning of the mounted at least one apparatus, or at least one mobile profile in which the at least one mounted apparatus may be selectively moved in a controllable manner, wherein the means for mounting is compatible with two or more platform modules.

2. The system of claim 1, wherein the means for mounting is compatible with a mounting platform module and with a mobile platform module.

3. A system comprising an apparatus mounting interface and at least one of:
   a) a mounting platform module comprising a selectively movable mounting platform, wherein the movable mounting platform and the apparatus mounting interface are sized and configured to interface with and releasably connect to each other, and are compatible with each other, and
   b) a mobile platform module, wherein the mobile platform module and the apparatus mounting interface are sized and configured to interface with and releasably connect to each other, and are compatible with each other,
   and further wherein the apparatus mounting interface is sized and configured to interface with and releasably connect to, and is compatible with, two or more platform modules, such that an apparatus mounted on the interface, which in turn is mounted on either the mounting platform of the mounting platform module or on the mobile platform module, can be removed and repositioned on another platform module without removing the apparatus from the mounting interface.

4. The system of claim 3, wherein the mounting interface is secured to and released from the platform modules by means of a clamp, wherein the clamp is tightened and loosened by one or more latches.

5. The system of claim 3, wherein the mounting interface is secured to and released from the platform modules by means of a clamp, wherein the clamp is tightened and loosened by one or more screw-in knobs.

6. The system of claim 3, comprising the mounting platform module and the apparatus mounting interface.

7. The system of claim 6, wherein the mounting platform module is an elongated base platform.

8. The system of claim 7, wherein the elongated base platform further comprises a plurality of selectively positioned stabilization elements securable to one or more stability sources.

9. The system of claim 8, wherein the stability sources are selected from one or more of boxes, mounts, and clamps.

10. The system of claim 3, comprising the mobile platform module and the apparatus mounting interface.

11. The system of claim 10, wherein the mobile platform module is an independent wheeled platform.

12. The system of claim 11, wherein the independent wheeled platform is a four-wheeled platform.

13. The system of claim 3, comprising both the mounting platform module and the mobile platform module.

14. The system of claim 13, wherein the mounting platform module is an elongated base platform and the mobile platform module is an independent wheeled platform.

15. The system of claim 13, wherein the apparatus mounting interface is a four-legged interface.

16. The system of claim 15, wherein the mobile platform module is a four-wheeled, independent wheeled platform.

17. The system of claim 3, wherein the apparatus mounting interface is a four-legged interface.

\* \* \* \* \*